United States Patent
Coan et al.

(10) Patent No.: US 9,987,600 B2
(45) Date of Patent: Jun. 5, 2018

(54) METHOD FOR MAKING GAS-SEPARATION MEMBRANES HAVING IMPROVED FLUX AND SELECTIVITY

(71) Applicant: Generon IGS, Inc., Houston, TX (US)

(72) Inventors: Frederick L. Coan, Antioch, CA (US); Arthur J. Barajas, Oakley, CA (US); Jeff C. Schletz, Clayton, CA (US)

(73) Assignee: Generon IGS, Inc., Houston, TX (US)

( * ) Notice: Subject to any disclaimer, the term of this patent is extended or adjusted under 35 U.S.C. 154(b) by 806 days.

(21) Appl. No.: 14/228,341

(22) Filed: Mar. 28, 2014

(65) Prior Publication Data

US 2014/0291887 A1 Oct. 2, 2014

Related U.S. Application Data

(60) Provisional application No. 61/806,998, filed on Apr. 1, 2013.

(51) Int. Cl.

| | |
|---|---|
| *B01D 71/68* | (2006.01) |
| *D01D 5/16* | (2006.01) |
| *D01F 1/08* | (2006.01) |
| *B01D 69/08* | (2006.01) |
| *B01D 53/22* | (2006.01) |
| *C08K 5/06* | (2006.01) |
| *D01D 10/00* | (2006.01) |

(Continued)

(52) U.S. Cl.
CPC ........... *B01D 71/68* (2013.01); *B01D 53/228* (2013.01); *B01D 69/087* (2013.01); *C08K 5/06* (2013.01); *D01D 5/16* (2013.01); *D01F 1/08* (2013.01); *B01D 67/0025* (2013.01); *D01D 5/06* (2013.01); *D01D 5/12* (2013.01); *D01D 5/24* (2013.01); *D01D 10/00* (2013.01); *D02J 1/22* (2013.01); *D02J 1/223* (2013.01); *D02J 1/228* (2013.01)

(58) Field of Classification Search
CPC .. D01D 5/06; D01D 5/12; D01D 5/16; D01D 5/24; D01D 10/00; D01F 1/08; D02J 1/22; D02J 1/223; D02J 1/224; D02J 1/227; D02J 1/228; B01D 67/0025; B01D 67/0027; B01D 67/0055; B01D 67/003; B01D 67/0058; B01D 67/0086; B01D 69/08; B01D 69/087; B01D 71/66
See application file for complete search history.

(56) References Cited

U.S. PATENT DOCUMENTS 2,994,576 A * 8/1961 Moelter .................... D01D 5/06
264/185
3,100,306 A * 8/1963 Oldershaw ............... D06B 3/04
118/54

(Continued)

*Primary Examiner* — Jeffrey Wollschlager
(74) *Attorney, Agent, or Firm* — William H. Eilberg

(57) ABSTRACT

A polymeric fiber for use in gas separation is formed from a spin dope which includes solvent and non-solvent materials. The fiber is passed through a quench bath, and then a leach bath, in which the solvent and non-solvent are removed. The quench bath and the leach bath include sets of rollers which transport the fiber through the system. Each set of rollers in the leach bath operates at a speed which is greater than or equal to the speed of the rollers which are immediately upstream. Thus, the fiber is stretched, in different amounts, at the same time that the solvent and non-solvent are being removed, and while the fiber is still wet. The resulting fiber has been found to exhibit superior flux and selectivity properties.

1 Claim, 1 Drawing Sheet

(51) Int. Cl.
    *D02J 1/22*     (2006.01)
    *D01D 5/24*     (2006.01)
    *D01D 5/06*     (2006.01)
    *D01D 5/12*     (2006.01)
    *B01D 67/00*    (2006.01)

(56) References Cited

U.S. PATENT DOCUMENTS

| | | | |
|---|---|---|---|
| 4,663,101 A | 5/1987 | Kavesh | |
| 4,664,681 A * | 5/1987 | Anazawa | B01D 67/0027 264/176.1 |
| 4,881,953 A | 11/1989 | Prasad | |
| 4,891,872 A * | 1/1990 | Sussman | B29C 55/00 264/290.5 |
| 5,049,169 A | 9/1991 | Teramoto | |
| 5,205,968 A * | 4/1993 | Damrow | B01D 67/0009 210/500.27 |
| 5,246,647 A * | 9/1993 | Beck | B01D 53/228 264/184 |
| 5,598,874 A * | 2/1997 | Alei | B01D 63/021 139/1 R |
| 5,746,916 A | 5/1998 | Kamo | |
| 5,888,434 A * | 3/1999 | Mahoney | B01D 53/228 264/184 |
| 6,143,411 A * | 11/2000 | Ferguson | D01D 5/24 428/394 |
| 6,218,441 B1 * | 4/2001 | Meluch | B01D 67/0011 210/500.21 |
| 7,497,894 B2 | 3/2009 | Jeffers | |
| 7,517,388 B2 | 4/2009 | Jensvold | |
| 7,578,871 B2 | 8/2009 | Jensvold | |
| 7,662,333 B2 | 2/2010 | Coan | |
| 2004/0026315 A1 * | 2/2004 | Han | A61M 1/16 210/500.41 |
| 2005/0034602 A1 * | 2/2005 | Coan | B01D 53/228 96/4 |
| 2005/0235826 A1 * | 10/2005 | Jensvold | B01D 53/268 95/52 |
| 2005/0252377 A1 * | 11/2005 | Coan | B01D 53/228 96/4 |
| 2009/0148659 A1 * | 6/2009 | Ishiodori | B01D 69/02 428/131 |
| 2011/0178193 A1 * | 7/2011 | Iruya | B01D 67/0011 521/79 |
| 2012/0029150 A1 | 2/2012 | Hadba | |
| 2013/0168895 A1 * | 7/2013 | Opper | C08B 37/0009 264/184 |

\* cited by examiner

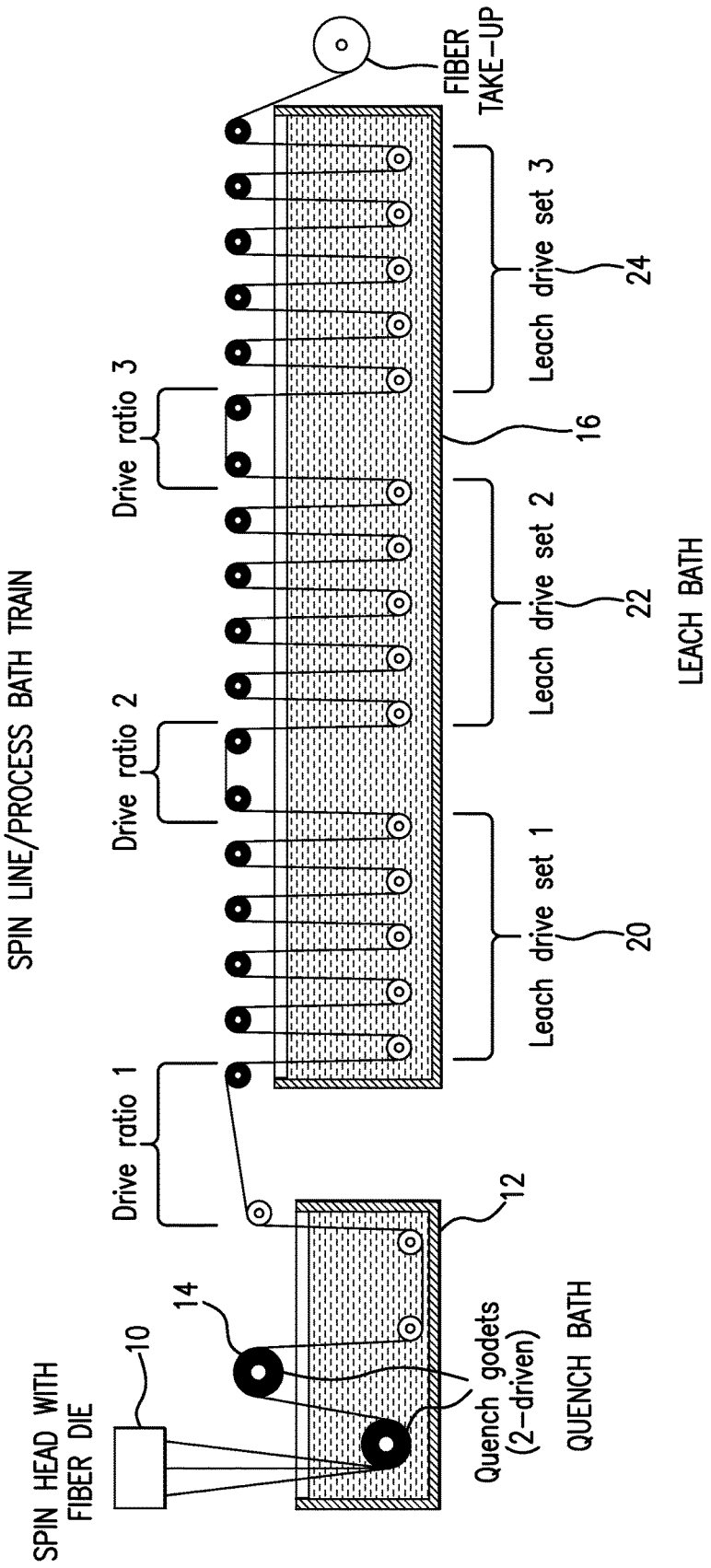

METHOD FOR MAKING GAS-SEPARATION MEMBRANES HAVING IMPROVED FLUX AND SELECTIVITY

CROSS-REFERENCE TO PRIOR APPLICATION

Priority is claimed from U.S. provisional patent application Ser. No. 61/806,998, filed Apr. 1, 2013, the disclosure of which is hereby incorporated herein.

BACKGROUND OF THE INVENTION

The present invention relates to the non-cryogenic separation of gas mixtures. The invention provides an improved method for making a polymeric membrane for use in the separation of gases such as air.

It has been known to use a polymeric membrane to separate air into components. Various polymers have the property that they allow different gases to flow through, or permeate, the membrane, at different rates. A polymer used in air separation, for example, will pass oxygen and nitrogen at different rates. The gas that preferentially flows through the membrane wall is called the "permeate" gas, and the gas that tends not to flow through the membrane is called the "non-permeate" or "retentate" gas. The selectivity of the membrane is a measure of the degree to which the membrane allows one component, but not the other, to pass through.

A membrane-based gas separation system has the inherent advantage that the system does not require the transportation, storage, and handling of cryogenic liquids. Also, a membrane system requires relatively little energy. The membrane itself has no moving parts; the only moving part in the overall membrane system is usually the compressor which provides the gas to be fed to the membrane.

A gas separation membrane unit is typically provided in the form of a module containing a large number of small, hollow fibers made of the selected polymeric membrane material. The module is generally cylindrical, and terminates in a pair of tubesheets which anchor the hollow fibers. The tubesheets are impervious to gas. The fibers are mounted so as to extend through the tubesheets, so that gas flowing through the interior of the fibers (known in the art as the bore side) can effectively bypass the tubesheets. But gas flowing in the region external to the fibers (known as the shell side) cannot pass through the tubesheets.

In operation, a gas is introduced into a membrane module, the gas being directed to flow through the bore side of the fibers. One component of the gas permeates through the fiber walls, and emerges on the shell side of the fibers, while the other, non-permeate, component tends to flow straight through the bores of the fibers. The non-permeate component comprises a product stream that emerges from the bore sides of the fibers at the outlet end of the module.

Alternatively, the gas can be introduced from the shell side of the module. In this case, the permeate is withdrawn from the bore side, and the non-permeate is taken from the shell side.

An example of a membrane-based air separation system is given in U.S. Pat. No. 4,881,953, the disclosure of which is incorporated by reference herein.

Other examples of fiber membrane modules are given in U.S. Pat. Nos. 7,497,894, 7,517,388, 7,578,871, and 7,662,333, the disclosures of which are all hereby incorporated by reference.

The effectiveness of a membrane in gas separation depends not only on the inherent selectivity of the membrane, but also on its capability of handling a sufficiently large product flow. A membrane module is therefore evaluated according to flux, i.e. the flow rates of various components through the membrane, as well as according to selectivity.

It has been known, in the prior art, that stretching a hollow fiber membrane will provide a higher gas flux through the membrane. However, such stretching has also been observed to cause a reduction in selectivity of the membrane. This effect is magnified for higher levels of stretching of the fiber. Thus, it has been believed, in the prior art, that the more the fiber is stretched, the greater the flux increase, and also the greater the loss of selectivity.

The present invention provides a method for making a gas-separation membrane in which both the gas flux and selectivity are improved. The polymeric membrane of the present composition therefore provides substantially improved performance, and therefore lowers the capital cost for gas-separation systems.

SUMMARY OF THE INVENTION

The present invention includes a method of making a polymeric fiber for use in non-cryogenic separation of gases such as air.

In brief, the invention comprises a method wherein the fiber is stretched at the same time that the solvent and non-solvent components of the spin dope are leached from the fiber. More particularly, the fiber is stretched to different degrees, at different positions within the fiber making apparatus.

The preferred polymer used in the present invention is polysulfone. The polymer fiber is formed from a spin dope comprising polysulfone, a solvent comprising N-methylpyrrolidone (NMP) and N,N-dimethyl acetamide (DMAC), and a non-solvent comprising triethylene glycol (TEG). The fiber exiting a die of a spin head is initially passed through a quench bath, driven by a plurality of godet rollers. The fiber is then passed through a leach bath, which removes the residual solvent and non-solvent.

In the preferred embodiment of the present invention, the leach bath includes three sets of rollers. Each set of rollers in the leach bath, as well as the godet rollers in the quench bath, are separately driven, so that each set can be driven at different, predetermined speeds.

In the method of the present invention, the first set of leach bath rollers rotate at a faster speed than the godet rollers, the second set of leach bath rollers rotates faster than the first set, and the third set of leach bath rollers rotates faster than the second set.

The ratio of the speed of a given set of rollers, to the speed of the preceding set of rollers, is called the drive ratio. In the present invention, a superior result was obtained with drive ratios of 1.15, 1.20, and 1.05, the latter figures pertaining to the drive ratios between adjacent pairs of sets of rollers.

Thus, the present invention stretches the fiber at the same time that residual solvent and non-solvent components are being removed. Fiber made according to the above-described method have been found to exhibit superior gas flux properties, as well as enhanced selectivity.

The present invention therefore has the primary object of providing a method of making a polymeric fiber for use in non-cryogenic gas separation.

The invention has the further object of improving the gas flux and selectivity of a gas-separation membrane.

The invention has the further object of providing a method of stretching a polymeric fiber to improve its gas flux properties, while at the same time improving its selectivity.

The invention has the further object of improving the efficiency of a membrane-based gas-separation process.

The reader skilled in the art will recognize other objects and advantages of the present invention, from a reading of the following brief description of the drawing, the detailed description of the invention, and the appended claims.

BRIEF DESCRIPTION OF THE DRAWING

FIG. 1 provides a schematic diagram showing an apparatus for practicing the process of the present invention, and the major components used in operating such process.

DETAILED DESCRIPTION OF THE INVENTION

The present invention comprises a method and apparatus for making a polymeric gas-separation membrane, in which the membrane has both an enhanced gas flux and an enhanced selectivity.

The invention has been made with polysulfone as the polymeric material comprising the membrane. It is believed that other materials could be used with the process of the invention.

The essence of the present method is the use of controlled stretching of the hollow fiber membrane, in a downstream hot extraction bath. The solvents used in the process of making the fiber are extracted at the same time that the stretching of the fiber is performed. The invention therefore comprises balancing the solvent and non-solvent extraction rates with the tensioning rates, of the hollow fiber membrane, during downstream processing. The fiber is stretched while it is still wet. This method differs from the prior art, in which fiber is stretched in a dry condition.

A polymeric fiber is made from a mixture known as a "spin dope". The spin dope includes a polymeric material or precursor, a solvent which dissolves the polymer, and a non-solvent in which the polymer is insoluble. The spin dope is spun into a fiber. In general, one tailors the spin dope to control the formation of the fiber. That is, the composition of the spin dope determines when the polymeric material will undergo a transformation from a state in which it is intermixed and homogeneous in the spin dope, to a state in which the polymer is the principal component.

The fiber formulation is defined by three parameters, namely 1) the percentage of polymer in the spin dope, 2) the type of polymer solvent(s), and 3) the non-solvent in the mixture. The terms "solvent" and "non-solvent" are used to mean, respectively, the components of the spin dope in which the polymer is soluble and insoluble.

The fiber formulation found to work best with the process of the present invention comprises about 45-52% polymer with a mixed solvent comprising N-methyl-pyrrolidone (NMP) and N,N-dimethyl acetamide (DMAC), and a non-solvent of triethylene glycol (TEG). The ratio of solvent to non-solvent can be in the range of about 2.15-2.30. The components of the mixed solvent both individually will dissolve the polymer, and they also do so as a mixture.

The amount of stretching of the fibers is controlled by the use of sets of driven rollers operated at different speeds. These differential speeds result in the hollow fiber being placed under tension, and the amount of tension in the fiber, at a particular point, depends on the difference between the speeds of adjacent rollers. At the same time, the solvent and non-solvent components, forming part of the spin dope used to create the hollow polymeric fiber, are being leached from the fiber. Proper balancing of the fiber tensioning and the solvent/non-solvent extraction has been found to result in enhanced fiber properties, with regard to both gas flux and selectivity.

The apparatus used to practice the present invention comprises an extruder and spin head to produce a multi-filament hollow fiber tow. FIG. 1 provides a schematic diagram of the system of the present invention. The hollow fibers exit spin head 10 and enter a quench bath 12. The quench bath 12 has a set of driven godet rollers 14 which are used to pull and draw down the hollow fibers from the spin head 10. The rate of rotation of the godet rollers helps to determine the fiber size, because stretching of the fiber causes the diameter of the fiber to decrease, due to mass balance. In FIG. 1, all positively driven rollers are indicated by solid black circles, and all passive rollers are shown by hollow circles.

After the quench bath there is a hot leach bath 16 which is used to extract residual solvent and non-solvent remaining in the fibers after they have left the quench bath 12.

The leach bath 16 has three sets of driven rollers with six driven rollers and five passive rollers in each set. Other numbers of rollers could be used, and the invention should not be deemed limited according to the number of driven rollers and passive rollers in each set. Each set of rollers can be run at a different and individually controllable speed. The number of sets of rollers can also be varied.

The first leach drive set 20 (Drive 1) pulls the fiber out of the quench bath and is typically run at a higher speed than the quench godet rollers 14 in order to overcome the water drag on the fiber in the quench bath 12. Once in the leach bath, the second (Drive 2) and third (Drive 3) drive sets 22 and 24 can be set at different drive speeds to create varying levels of tension on the fiber between Drive 1 and Drive 2 and also between Drive 2 and Drive 3.

In the system of the present invention, the difference in speeds between groups of rollers is expressed as a drive ratio between the two drive sets. A ratio of 1.00 means that the two drives are operating at the same speed. A ratio of 1.20 means that the current drive is operating 20% faster than the upstream drive. For example, for a drive ratio of 1.20, if the current drive speed is 120 ft/min (36.6 m/min), the upstream drive would be operated at 100 ft/min (30.5 m/min).

In the Examples below, the above ratios are designated as the leach speed drive ratios. The first ratio refers to the speed differential between the quench godet rollers 14 and the leach Drive 1 (rollers 20), the second drive ratio is the speed differential between leach Drives 1 and 2 (rollers 20 and 22), and the third drive ratio is the speed differential between leach Drives 2 and 3 (rollers 22 and 24).

In general, a given set of rollers should be operated at a speed which is greater than or equal to the speed of the rollers which are upstream of the given set, so as to insure that the fibers are pulled through the system under tension.

The solvent/non-solvent extraction rates can be influenced by the bath temperatures and upstream spin dope composition. By controlling both the tensioning and extraction profile in the baths, a superior hollow fiber membrane was produced, as shown by the following Examples.

In each of the following Examples, the same equipment was used to produce the fiber. Both Examples used the following parameters. The melt pump operated at 65 grams per minute. The solvent was a mixture of NMP and DMAC, with the ratio of NMP to DMAC equal to 60/40. The non-solvent was TEG. The ratio of solvent to non-solvent (S/NS) was 2.2. The shroud flow rate was 4 scfm. The quench bath temperature was 5.3° C. The line rate was 130 feet per minute (39.6 m/min).

The polymer in both Examples was polysulfone. The solvent in both Examples was N-methyl-pyrrolidone (NMP) and N,N-dimethyl acetamide (DMAC), and the non-solvent was triethylene glycol (TEG).

Example 1

This Example shows the manufacture of polymeric fiber having a relatively low amount of stretching or tension.

In this Example, the solids ratio, i.e. the percentage of polymer relative to the total number of grams of polymer and solvents, was 50%.

The spin temperature, i.e. the temperature at which the polymer was spun into a fiber, was 61.1° C.

The leach bath temperature was 51.7° C.

The leach speed drive ratios in this Example were 1.07, 1.01, and 1.00. These values refer, respectively, to Drive 1, Drive 2, and Drive 3, as described above, and as indicated in FIG. 1.

The fibers so made were formed into a bundle comprising 90 fibers, each having a length of about 35 cm. The bundle of fibers was soaked in water for 7.5 hours, followed by air drying at 50° C. for 40 minutes.

The performance of the fibers was as follows.
$O_2$ flux: $1.77 \times 10^{-6}$ scc/(sec-cm$^2$-cm Hg)
$N_2$ flux: $0.64 \times 10^{-6}$ scc/(sec-cm$^2$-cm Hg)
$O_2/N_2$ selectivity: 2.74

Example 2

This Example shows the manufacture of polymeric fiber having a relatively high amount of stretching or tension.

In this Example, the spin temperature was 61.4° C. The leach bath temperature was 51.0° C. The leach speed drive ratios were 1.15, 1.20, and 1.05. All other parameters, not mentioned in this Example 2, were the same as in Example 1. Also, the fiber bundles were made in the same manner as in Example 1.

The performance of the fibers was as follows.
$O_2$ flux: $7.32 \times 10^{-6}$ scc/(sec-cm$^2$-cm Hg)
$N_2$ flux: $1.02 \times 10^{-6}$ scc/(sec-cm$^2$-cm Hg)
$O_2/N_2$ selectivity: 7.18

Thus, Example 2 showed a significant performance improvement over Example 1. The stretching of the fiber, coupled with the leaching of the solvent and non-solvent components, produced a fiber having both improved gas flux and improved selectivity.

The invention can be practiced within the following recommended ranges of parameters:

The melt pump can operate in a range of about 45-95 grams/min.

The ratio of the solvents (NMP/DMAC) can be from 100/0 to 0/100.

The ratio of solvent to non-solvent (S/NS) can be from about 1.6 to 9.0.

The shroud flow rate can be in the range of about 1-8 scfm.

The quench bath temperature can be in the range of about 4-30° C.

The line rate can be in the range of about 100-350 feet/min.

The solids ratio can be in the range of about 35-55%.

The spin temperature can be in the range of about 55-85° C.

The leach bath temperature can be in the range of about 30-84° C.

The leach speed drive ratios can range from 1.0, 1.0, 1.0 to 2.0, 1.8, 1.8.

The above Example 2 represents an unexpectedly excellent result. According to conventional teaching, stretching a hollow fiber was believed to provide a higher gas flux, at the expense of a reduction in selectivity of the membrane. But with the present invention, and contrary to conventional teaching, the selectivity of the membrane improved substantially, even though the fibers were stretched more. The invention is therefore believed to be a major advance in the technology for making polymeric fiber membranes for gas separation.

The invention can be modified by varying the parameters described in the Examples above, within the recommended ranges. It is believed that the invention is applicable to other polymers, in addition to polysulfone.

The invention can be modified in other ways which will be apparent to those skilled in the art. Such modifications should be considered within the spirit and scope of the following claims.

What is claimed is:

1. A method for making a gas separation membrane having improved flux and selectivity, the method comprising the steps of:
    a) producing a fiber from a spin dope which comprises a polymer and solvent and non-solvent components,
    b) passing the fiber through a quench bath, the fiber being transported by at least one quench bath roller,
    c) passing the fiber through a leach bath, the fiber being transported by at least one leach bath roller,
    wherein the leach bath roller is operated at a greater speed than the quench bath roller, such that the fiber is stretched while the solvent and non-solvent components are leached from the fiber,
    wherein:
    d) the leach bath includes first, second, and third sets of rollers,
    e) a ratio of a speed of the first set of rollers to a speed of the quench roller is designated by A,
    f) a ratio of a speed of the second set of rollers to the speed of the first set of rollers is designated by B,
    g) a ratio of a speed of the third set of rollers to the speed of the second set of rollers is designated by C,
    wherein A is selected to be 1.15,
    wherein B is selected to be 1.20, and
    wherein C is selected to be 1.05,
    further comprising selecting the polymer to be polysulfone, selecting the solvent to comprise N-methyl-pyrrolidone (NMP) and N,N-dimethyl acetamide (DMAC), and selecting the non-solvent to be triethylene glycol (TEG).

* * * * *